(No Model.)

T. H. HICKS.
SECONDARY BATTERY.

No. 434,444. Patented Aug. 19, 1890.

Witnesses:
P. M. Hulbert
Geo. A. Gregg

Inventor:
Thomas H. Hicks
By Thos. S. Sprague & Son
Att'y.

UNITED STATES PATENT OFFICE.

THOMAS H. HICKS, OF DETROIT, MICHIGAN.

SECONDARY BATTERY.

SPECIFICATION forming part of Letters Patent No. 434,444, dated August 19, 1890.

Application filed July 8, 1889. Serial No. 316,737. (No model.)

*To all whom it may concern:*

Be it known that I, THOMAS H. HICKS, a citizen of Great Britain, residing at Detroit, in the county of Wayne and State of Michigan, have invented certain new and useful Improvements in Secondary Batteries, of which the following is a specification, reference being had therein to the accompanying drawings.

This invention relates to new and useful improvements in secondary or storage batteries; and the invention consists in the peculiar mode of constructing the same, all as more fully hereinafter described, shown in the accompanying drawings, and then definitely claimed.

Figure 1:
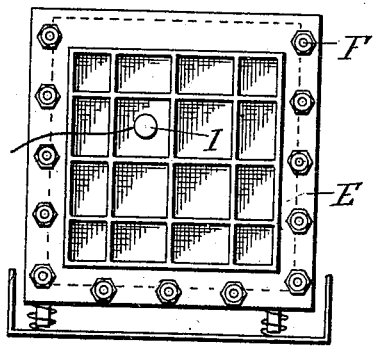
Figure 2:
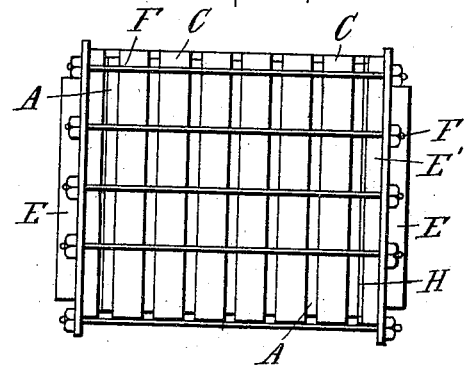
Figure 4:
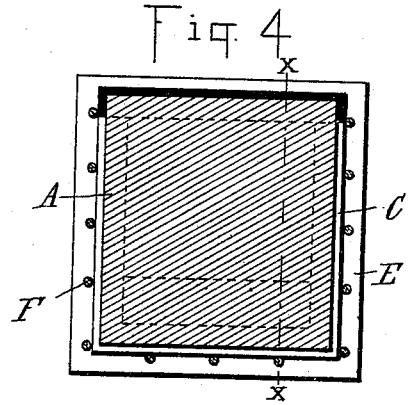
Figure 3:
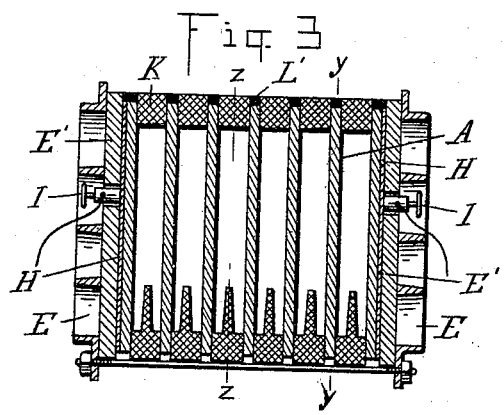
Figure 5:
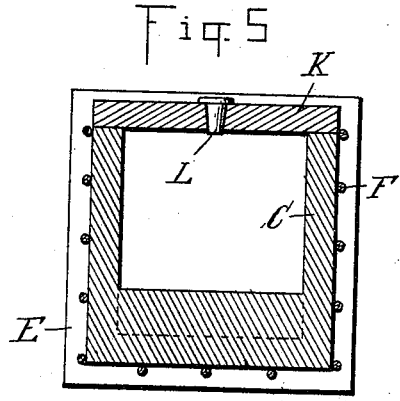
Figures 6, 7:
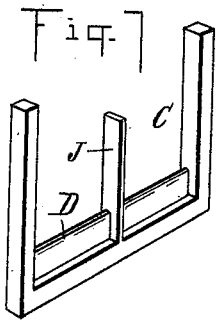
Figure 8:
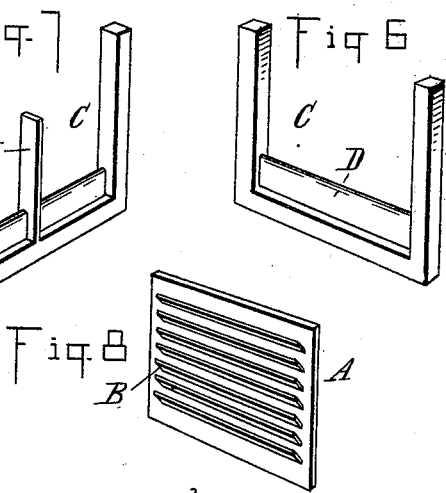

Figure 1 is an end elevation of my improved battery. Fig. 2 is a side elevation thereof. Fig. 3 is a vertical section on line X X in Fig. 4. Fig. 4 is a vertical cross-section on line Y Y in Fig. 3. Fig. 5 is a vertical cross-section on line Z Z in Fig. 3. Fig. 6 is a detached perspective view of one of the frames forming the water-tight cells between the elements. Fig. 7 is a similar perspective view of a modification thereof, and Fig. 8 is a detached perspective view of one of the elements which I preferably employ in the construction of my improved batteries.

A are the elements or plates composing the battery, and which may be of any desired construction—such as at present used in the construction of such batteries—provided they are not porous, but adapted to form water-tight partitions. I preferably use, however, the ordinary lead plates, provided upon their opposite sides with gutters or troughs B, adapted to receive and hold the active material, or material to become active, upon the faces of the plates.

C in Fig. 6 is a square or rectangular frame, preferably three-sided, the top bar being omitted. This frame I make of kerite or of other like insulating water-proof material, and upon the bottom bar, projecting centrally upward, I cast integral with it the vertical partition D, which projects only a little distance upward between the sides of the frame. These frames are of a size, so that when placed between the plates or elements they are adapted to form the bottom and side walls of a suitable cell for containing the electrolyte. Any number of plates may be joined together into a battery by using these frames to form the cells, and in order to make them water-tight in a simple and expeditious manner, the plates and frames are firmly clamped together between a pair of clamping-plates E, which are united by clamping-bolts F on the bottom and sides in such manner that in tightening the plates or the nuts on the plates, sufficient pressure may be exerted to form water-tight cells without other means between the elements.

The plates E are preferably constructed of cast-iron, and a solid plate E' of insulating material is placed between it and the first adjoining element, so as to distribute the pressure evenly and prevent any buckling.

The battery is intended to have the plates in series—that is, to have one side of each plate positive and the other side negative—with the end plates forming the poles of the battery. It is necessary to keep each cell water-tight, and to keep the plates insulated from each other, to cause the current to flow in a transverse direction through all the plates, as the active material applied to the face of the plate is often liable under severe jarring or jolting to fall to the bottom of the cell and cause short-circuiting. I construct each frame with a dividing partition projecting up to within a sufficient distance from the bottom to prevent the forming of a conducting-bridge of active material between any of the elements on the bottom of the cell.

The outer plates or elements of the battery I preferably provide with pole-plates H, of copper or metal of greater conductivity than the elements or plates usually consists, and to a binding-post I, secured to this pole-plate, I connect the charging and discharging wires.

With elements or plates which have a tendency to buckle, I construct the frames C as shown in Fig. 7, in which, in addition to the partition D on the bottom bar, there is one or more central partitions J of the same thickness as the outer bars of the frame. These partitions project sufficiently upward to act as braces between the plates to prevent them from buckling, and they may be readily formed integral with the whole frame by molding the latter of kerite or other suitable material, as described.

In using my batteries in vehicles and in places where the battery is liable to be jolted, I close the top of each cell between each pair of plates by a top bar K of suitable size to fit in between the top edges of the plates, and to permit the gases to escape I provide each strip with a suitable aperture, which may be closed with a cork or stopper L when not needed to be open. To form water-tight joints on top, also, I use melted paraffine, which I pour in between the strips K, as shown at L' in Fig. 3, the strips K being made high enough to form grooves between them for the reception of the paraffine. The whole battery is preferably set or rests upon springs in an outer tray, to receive any occasional spilling or overflow. It will be seen that this manner of construction is very simple, and can be applied to batteries of any size. At the same time the expense of constructing the batteries is reduced to a minimum.

It will be seen that I dispense altogether with the inclosing-box usually employed, using only the small tray shown in Fig. 1 to catch anything that may accidentally leak or be spilled or overflow. I consider the box generally used a disadvantage, as it will prevent the detection of any leak liable to short-circuit the plates. In my construction, as an additional safeguard to prevent leakage and short-circuiting, I make the insulating-frames larger than the plates, so as to form vertical grooves between the projecting ends of the frame, which I fill with paraffine or other water-proof cement, and in case of a leakage still prevent the short-circuiting of the plates, as the liquid cannot be passed from one side of the plate to the other side.

What I claim as my invention is—

The combination of a series of plates clamped together, with insulating-frames between them, said frames being made of greater width than the battery-plates, whereby vertical recesses or grooves are formed between the projecting ends, and of water-proof cement in said recesses, substantially as described.

In testimony whereof I affix my signature, in presence of two witnesses, this 13th day of June, 1889.

THOMAS H. HICKS.

Witnesses:
ED. McBREARLY,
P. M. HULBERT.